(12) United States Patent
Weber et al.

(10) Patent No.: US 9,567,463 B2
(45) Date of Patent: Feb. 14, 2017

(54) HIGH-STRENGTH BLENDS BASED ON POLYARYLENE ETHERS

(71) Applicant: BASF SE, Ludwigshafen (DE)

(72) Inventors: Martin Weber, Maikammer (DE); Christian Maletzko, Altrip (DE); Florian Hennenberger, Heppenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/630,658

(22) Filed: Sep. 28, 2012

(65) Prior Publication Data

US 2013/0085224 A1    Apr. 4, 2013

Related U.S. Application Data

(60) Provisional application No. 61/541,109, filed on Sep. 30, 2011.

(51) Int. Cl.

| | | |
|---|---|---|
| *C08F 283/00* | (2006.01) | |
| *C08G 75/00* | (2006.01) | |
| *C08L 81/00* | (2006.01) | |
| *C08G 18/42* | (2006.01) | |
| *C08L 51/00* | (2006.01) | |
| *C08L 67/00* | (2006.01) | |
| *C08G 65/48* | (2006.01) | |
| *C08L 81/06* | (2006.01) | |

(52) U.S. Cl.
CPC ..................... *C08L 81/06* (2013.01)

(58) Field of Classification Search
None
See application file for complete search history.

(56) References Cited

U.S. PATENT DOCUMENTS

| | | | |
|---|---|---|---|
| 4,161,470 A | 7/1979 | Calundann | |
| 4,728,715 A | 3/1988 | Kock et al. | |
| 4,731,432 A | 3/1988 | Portugall | |
| 4,749,902 A | 6/1988 | Weiss | |
| 4,751,128 A | 6/1988 | Portugall et al. | |
| 4,797,465 A | 1/1989 | Portugall et al. | |
| 5,502,122 A * | 3/1996 | Weber et al. ............ | 525/534 |
| 2003/0069371 A1 | 4/2003 | Weber et al. | |
| 2011/0218294 A1 | 9/2011 | Weber et al. | |
| 2011/0237693 A1 | 9/2011 | Weber et al. | |
| 2011/0237694 A1 | 9/2011 | Weber et al. | |
| 2011/0294912 A1 | 12/2011 | Weber et al. | |
| 2012/0153232 A1 | 6/2012 | Gibon et al. | |
| 2012/0153233 A1 | 6/2012 | Gibon et al. | |
| 2012/0181487 A1 | 7/2012 | Gibon et al. | |
| 2012/0213998 A1 | 8/2012 | Weber et al. | |
| 2012/0252962 A1 | 10/2012 | Weber et al. | |
| 2012/0296028 A1 | 11/2012 | Weber et al. | |
| 2012/0296031 A1 | 11/2012 | Weber et al. | |

FOREIGN PATENT DOCUMENTS

| | | |
|---|---|---|
| CA | 1268892 A1 | 5/1990 |
| DE | 19961040 A1 | 6/2001 |
| EP | 139 303 B1 | 3/1988 |
| EP | 225 539 B1 | 8/1989 |
| EP | 226 847 B1 | 8/1989 |
| EP | 226 839 B1 | 3/1990 |
| EP | 226 978 B1 | 12/1991 |
| EP | 257558 B1 | 1/1992 |
| WO | WO-2012084785 A1 | 6/2012 |
| WO | WO-2012146629 A1 | 11/2012 |

OTHER PUBLICATIONS

U.S. Appl. No. 13/548,698.
U.S. Appl. No. 13/566,096.
U.S. Appl. No. 13/599,528.
U.S. Appl. No. 13/630,658.
U.S. Appl. No. 13/648,726.
U.S. Appl. No. 61/616,443.
U.S. Appl. No. 61/635,966.
U.S. Appl. No. 61/635,974.
U.S. Appl. No. 61/652,344.
U.S. Appl. No. 61/659,455.
U.S. Appl. No. 61/682,784.
Datta, et al., "The effect of compatibilization on blends of polypropylene with a liquid-crystalline polymer", Polymer, vol. 34, No. 4, (1993), p. 759-766.
Krishnaswamym, et al., "Influence of a reactive terpolymer on the properties of in situ compsites based on polyamides and thermotropic liquid crystalline polyesters", Polymer, vol. 40, (1999), p. 701-716.
Zhang, et al., "Interfacial compatibilization for PSF/TLCP blends by a modified polysulfone", Polymer, vol. 43, (2002), p. 1437-1446.

* cited by examiner

Primary Examiner — Susannah Chung
Assistant Examiner — Robert T Butcher
(74) Attorney, Agent, or Firm — Drinker Biddle & Reath LLP

(57) ABSTRACT

The present invention relates to molding compositions comprising
(A) from 29 to 89% by weight of at least one polyarylene ether sulfone having an average number of phenolic end groups per chain of from 0 to 0.2,
(B) from 0.5 to 20% by weight of a thermotropic polymer,
(C) from 0.5 to 10% by weight of a polyarylene ether having predominantly OH end groups,
(D) from 10 to 70% by weight of at least one fibrous or particulate filler,
(E) from 0 to 40% by weight of additives or processing aids,
where the total of the proportions by weight is 100% by weight, based on the thermoplastic molding composition.

15 Claims, No Drawings

HIGH-STRENGTH BLENDS BASED ON POLYARYLENE ETHERS

CROSS-REFERENCE TO RELATED APPLICATIONS

This application claims the benefit of U.S. Provisional Application 61/541,109, filed Sep. 30, 2011, which is incorporated herein by reference.

The present invention relates to molding compositions comprising
(A) from 29 to 89% by weight of at least one polyarylene ether sulfone having an average number of phenolic end groups per chain of from 0 to 0.2,
(B) from 0.5 to 20% by weight of a thermotropic polymer,
(C) from 0.5 to 10% by weight of a polyarylene ether having predominantly OH end groups,
(D) from 10 to 70% by weight of at least one fibrous or particulate filler,
(E) from 0 to 40% by weight of additives or processing aids, where the total of the proportions by weight is 100% by weight, based on the thermoplastic molding composition.

Polyarylene ethers are classified as high-performance thermoplastics. Polyarylene ethers, being amorphous thermoplastics, can withstand mechanical loads for a short time close to their glass transition temperature. A disadvantage is that resistance to aggressive fluids is sometimes low. Polyarylene ethers also have high melt viscosity, and this is in particular disadvantageous for processing by means of injection molding to give large moldings.

The high melt viscosity is also disadvantageous for production of molding compositions with high loading of filler or of fiber.

The person skilled in the art is aware that the flowability of polyarylene ethers can be influenced by adding LC polymers. However, molding compositions of this type have low tensile strain at break values because of defective phase adhesion.

There are known approaches for improving the adhesion between the polymer matrix and the LC polymer, by using anhydride-modified polymers as third component in order to achieve coupling between the respective polymer matrix and the LC polymers (Datta, A. et. al., Polymer 1993, 34, p. 759, Baird, D. G. et. al., Polymer 1999, 40, p. 701).

The use of PSU grafted with maleic anhydride has been described for compatibilizing polysulfone with LC polymers (He, J. et. al., Polymer 2002, 43, p. 1437).

DE 19961040 discloses the use of LC polymers in reinforced molding compositions made of polyether sulfone and polyamide.

It was an object of the present invention to provide high-strength thermoplastic molding compositions based on polyether sulfones. A particular intention here was to provide molding compositions with good processability in the melt together with high mechanical strength.

On the one hand, the molding compositions are intended to have high stiffness, even at high temperatures. On the other hand, the molding compositions are also intended to have good flowability.

A molding composition described in the introduction achieves the object.

In the invention, the thermoplastic molding composition comprises at least one or more, but preferably one, polyarylene ether sulfone(s) (A) having an average of at most 0.2 phenolic end groups per polymer chain. The expression "on average" here means numeric average.

The amounts of component A) present in the thermoplastic molding compositions of the invention are preferably from 29 to 89% by weight, particularly preferably from 35 to 80% by weight, in particular from 40 to 75% by weight, very particularly preferably from 50 to 60% by weight, where the total of the proportions by weight of components A) to E) is 100% by weight, based on the molding composition.

It is obvious to the person skilled in the art that the phenolic end groups are reactive and can be present in at least to some extent reacted form in the thermoplastic molding compositions. The thermoplastic molding compositions are preferably produced via compounding, i.e. via mixing of the components in a flowable state.

For the purposes of the present invention, the expression "phenolic end group" means a hydroxy group bonded to an aromatic ring and optionally also present in deprotonated form. The person skilled in the art is aware that a phenolic end group can also take the form of what is known as a phenolate end group by virtue of cleavage of a proton as a consequence of exposure to a base. The expression "phenolic end groups" therefore expressly comprises not only aromatic OH groups but also phenolate groups.

The proportion of phenolic end groups is preferably determined via potentiometric titration. For this, the polymer is dissolved in dimethylformamide and is titrated with a solution of tetrabutylammonium hydroxide in toluene/methanol. The end point is recorded potentiometrically. The proportion of halogen end groups is preferably determined by means of atomic spectroscopy.

The person skilled in the art can use known methods to determine the average number of phenolic end groups per polymer chain ($n^{OH}$), on the assumption of strictly linear polymer chains, using the following formula: $n^{OH}=m^{OH}$ [in % by weight]/$100*M_n^P$ [in g/mol]*$1/17$, starting from the proportion by weight of phenolic end groups, based on the total weight of the polymer ($m^{OH}$) and from the number-average molecular weight ($M_n^P$).

As an alternative, the average number of phenolic end groups per polymer chain ($n^{OH}$) can be calculated as follows: $n^{OH}=2/(1+(17/35.45*m^{Cl}/m^{OH}))$ on the assumption that the end groups present are exclusively OH groups and Cl groups, and on the assumption of strictly linear polymer chains, if the proportion by weight of Cl end groups ($m^{Cl}$) is simultaneously known. The person skilled in the art knows how to adapt the calculation methods in the event that end groups other than Cl are present.

Production of polyarylene ether sulfones with simultaneous control of end groups is known to the person skilled in the art and is described in more detail at a later stage below. The known polyarylene ethers usually have halogen end groups, in particular —F or —Cl, or phenolic OH end groups or phenolate end groups, where the latter can be present as such or in reacted form, in particular in the form of —OCH$_3$ end groups.

It is preferable that the polyarylene ether sulfones (A) have at most 0.01% by weight, particularly preferably at most 0.005% by weight, of phenolic end groups, based on the amount by weight of component (A).

The respective upper limit for content of phenolic end groups in components (A) is a function of the number of end groups available per molecule (this being two in the case of linear polyarylene ethers) and of the number-average chain length. The person skilled in the art is aware of these calculations.

It is preferable that the average number of phenolic end groups per polymer chain in component (A) is from 0 to 0.2, in particular from 0 to 0.1, particularly preferably from 0 to 0.05, very particularly preferably from 0 to 0.02, with particular preference at most 0.01.

Polyarylene ethers are a class of polymer known to a person skilled in the art. In principle, component (A) used can comprise any of the polyarylene ethers that are known to the person skilled in the art and/or that can be produced by known methods. These methods are explained at a later stage below.

Preferred polyarylene ether sulfones (A) are composed of units of the general formula I

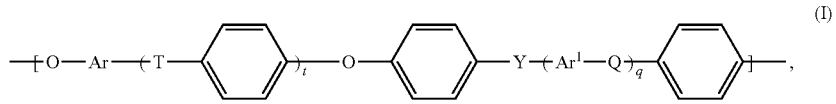

(I)

where the definitions of the symbols t, q, Q, T, Y, Ar and $Ar^1$ are as follows:

t, q: independently of one another 0, 1, 2, or 3,

Q, T, Y: independently of one another in each case a chemical bond or group selected from —O—, —S—, —$SO_2$—, S=O, C=O, —N=N—, and —$CR^aR^b$—, where $R^a$ and $R^b$ independently of one another are in each case a hydrogen atom or a $C_1$-$C_{12}$-alkyl, $C_1$-$C_{12}$-alkoxy, or $C_6$-$C_{18}$-aryl group, and where at least one of Q, T, and Y is —$SO_2$—, and Ar and $Ar^1$: independently of one another an arylene group having from 6 to 18 carbon atoms.

If, within the abovementioned preconditions, Q, T or Y is a chemical bond, this then means that the adjacent group on the left-hand side and the adjacent group on the right-hand side are present with direct linkage to one another via a chemical bond.

However, it is preferable that Q, T, and Y in formula I are selected independently of one another from —O— and —$SO_2$—, with the proviso that at least one of the group consisting of Q, T, and Y is —$SO_2$—.

If Q, T, or Y is —$CR^aR^b$—, $R^a$ and $R^b$ independently of one another are in each case a hydrogen atom or a $C_1$-$C_{12}$-alkyl, $C_1$-$C_{12}$-alkoxy, or $C_6$-$C_{18}$-aryl group.

Preferred $C_1$-$C_{12}$-alkyl groups comprise linear and branched, saturated alkyl groups having from 1 to 12 carbon atoms. The following moieties may be mentioned in particular: $C_1$-$C_6$-alkyl moiety, e.g. methyl, ethyl, n-propyl, isopropyl, n-butyl, sec-butyl, 2- or 3-methylpentyl, and longer chain moieties, e.g. unbranched heptyl, octyl, nonyl, decyl, undecyl, lauryl, and the singly branched or multi-branched analogs thereof.

Alkyl moieties that can be used in the abovementioned $C_1$-$C_{12}$-alkoxy groups that can be used are the alkyl groups defined at an earlier stage above having from 1 to 12 carbon atoms. Cycloalkyl moieties that can be used with preference in particular comprise $C_3$-$C_{12}$-cycloalkyl moieties, e.g. cyclopropyl, cyclobutyl, cyclopentyl, cyclo-hexyl, cyclo-heptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are independently of one another a $C_6$-$C_{18}$-arylene group. On the basis of the starting materials described at a later stage below, it is preferable that Ar derives from an electron-rich aromatic substance that is very susceptible to electrophilic attack, preferably selected from the group consisting of hydroquinone, resorcinol, dihydroxynaphthalene, in particular 2,7-dihydroxynaphthalene, and 4,4'-bisphenol. $Ar^1$ is preferably an unsubstituted $C_6$- or $C_{12}$-arylene group.

Particular $C_6$-$C_{18}$-arylene groups Ar and $Ar^1$ that can be used are phenylene groups, e.g. 1,2-, 1,3-, and 1,4-phenylene, naphthylene groups, e.g. 1,6-, 1,7-, 2,6-, and 2,7-naphthylene, and also the arylene groups that derive from anthracene, from phenanthrene, and from naphthacene.

In the preferred embodiment according to formula I, it is preferable that Ar and $Ar^1$ are selected independently of one another from the group consisting of 1,4-phenylene, 1,3-phenylene, naphthylene, in particular 2,7-dihydroxynaphthylene, and 4,4'-bisphenylene.

Preferred polyarylene ether sulfones (A) are those which comprise at least one of the following repeat units Ia to Io:

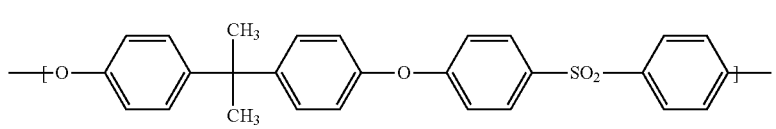

Ia

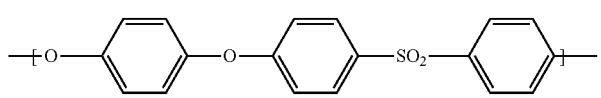

Ib

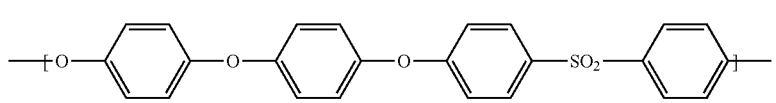

Ic

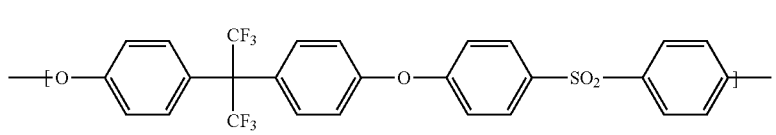

Id

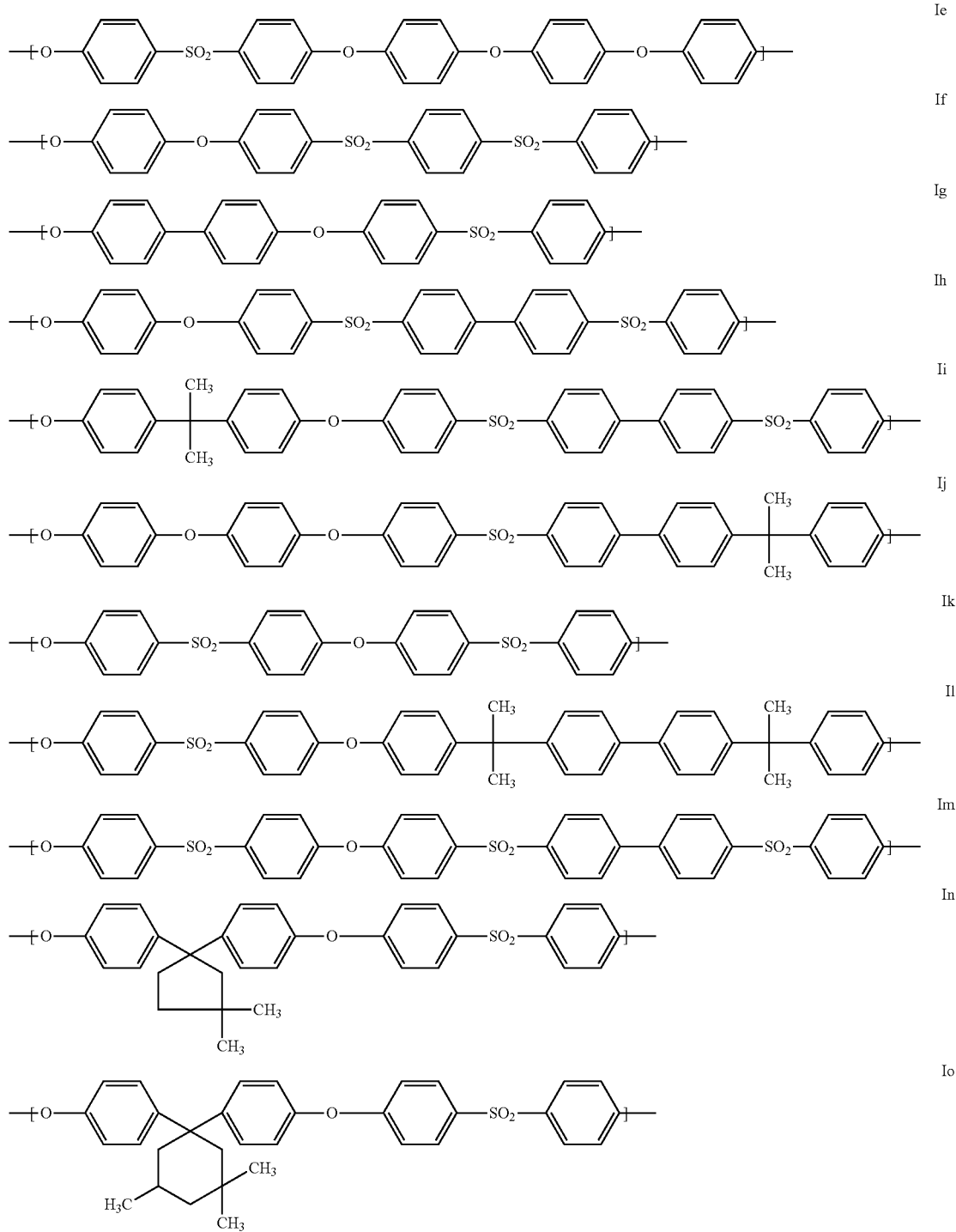

Other preferred units, in addition to the units Ia to Io that are preferably present, are those in which one or more 1,4-phenylene units deriving from hydroquinone have been replaced by 1,3-phenylene units deriving from resorcinol, or by naphthylene units deriving from dihydroxynaphthalene.

Particularly preferred units of the general formula I are the units Ia, Ig, and Ik. It is also particularly preferable that the polyarylene ether sulfones of component (A) are in essence composed of one type of unit of the general formula I, in particular of one unit selected from Ia, Ig, and Ik.

In one particularly preferred embodiment, Ar=1,4-phenylene, t=1, q=0, T is a chemical bond, and Y=$SO_2$. Particularly preferred polyarylene ether sulfones (A) composed of the abovementioned repeat unit are termed polyphenylene sulfone (PPSU) (formula Ig).

In another particularly preferred embodiment, Ar=1,4-phenylene, t=1, q=0, T=C($CH_3$)$_2$, and Y=$SO_2$. Particularly preferred polyarylene ether sulfones (A) composed of the abovementioned repeat unit are termed polysulfone (PSU) (formula Ia).

In another particularly preferred embodiment, Ar=1,4-phenylene, t=1, q=0, T=Y=SO$_2$. Particularly preferred polyarylene ether sulfones (A) composed of the abovementioned repeat unit are termed polyether sulfone (PESU) (formula Ik). This embodiment is very particularly preferred.

For the purposes of the present invention, abbreviations such as PPSU, PESU, and PSU are in accordance with DIN EN ISO 1043-1:2001.

The weight-average molar masses $M_w$ of the polyarylene ether sulfones (A) of the present invention are preferably from 10 000 to 150 000 g/mol, in particular from 15 000 to 120 000 g/mol, particularly preferably from 18 000 to 100 000 g/mol, determined by means of gel permeation chromatography in dimethylacetamide as solvent against narrowly-distributed polymethyl methacrylate as standard.

The apparent melt viscosity at 350° C./1150 s$^{-1}$ of the polyarylene ether sulfone (A) is moreover preferably from 150 to 300 Pa s, with preference from 150 to 275 Pa s. Flowability was assessed on the basis of melt viscosity. Melt viscosity was determined by means of a capillary rheometer. Apparent viscosity at 350° C. was determined here as a function of shear rate in a capillary viscometer (Gotffert Rheograph 2003 capillary viscometer) using a circular capillary of length 30 mm, radius 0.5 mm, an inlet angle of 180° for the nozzle, a diameter of 12 mm for the melt reservoir vessel, and a preheating time of 5 minutes. The values stated were determined at 1150 s$^{-1}$.

Production processes that lead to the abovementioned polyarylene ethers are known per se to the person skilled in the art and are described by way of example in Herman F. Mark, "Encyclopedia of Polymer Science and Technology", third edition, volume 4, 2003, chapter "Polysulfones" pages 2 to 8, and also in Hans R. Kricheldorf, "Aromatic Polyethers" in: Handbook of Polymer Synthesis, second edition, 2005, pages 427 to 443.

Particular preference is given to the reaction, in aprotic polar solvents and in the presence of anhydrous alkali metal carbonate, in particular sodium carbonate, potassium carbonate, calcium carbonate, or a mixture thereof, very particularly preferably potassium carbonate, between at least one aromatic compound having two halogen substituents and at least one aromatic compound having two functional groups reactive toward abovementioned halogen substituents. One particularly suitable combination is N-methylpyrrolidone as solvent and potassium carbonate as base.

It is preferable that the polyarylene ethers (A) have either halogen end groups, in particular chlorine end groups, or etherified end groups, in particular alkyl ether end groups, these being obtainable via reaction of the OH or, respectively, phenolate end groups with suitable etherifying agents.

Examples of suitable etherifying agents are monofunctional alkyl or aryl halide, e.g. $C_1$-$C_6$-alkyl chloride, $C_1$-$C_6$-alkyl bromide, or $C_1$-$C_6$-alkyl iodide, preferably methyl chloride, or benzyl chloride, benzyl bromide, or benzyl iodide, or a mixture thereof. For the purposes of the polyarylene ethers of component (A) preferred end groups are halogen, in particular chlorine, alkoxy, in particular methoxy, aryloxy, in particular phenoxy, or benzyloxy.

In the invention, the thermoplastic molding composition comprises at least one or more, but preferably one, thermotropic polymer(s) (B).

The amounts of component (B) present in the thermoplastic molding compositions of the invention are preferably from 0.5 to 20% by weight, particularly preferably from 0.7 to 18% by weight, in particular from 1 to 15% by weight, very particularly preferably from 1.5 to 10% by weight, where the total of the proportions by weight of components (A) to (E) is 100% by weight, based on the molding composition.

The expression "thermotropic polymer (B)" means a polymer which within a defined temperature range has liquid-crystalline properties. Particularly suitable thermotropic polymers are those which are liquid-crystalline within the temperature range within which the molding compositions of the invention are processed. The transition temperature Tk of the liquid-crystalline phase in the melt of the polymers suitable as component (B) is generally 350° C. or lower. Transition temperatures Tk of preferred liquid-crystalline polymers B are 300° C. or lower. In particular, the transition temperatures Tk are from 200 to 350° C. Tk can be determined by means of DSC measurement using a heating rate of 20 K/min, where the values stated are determined in the 2$^{nd}$ heating procedure.

Thermotropic component (B) that can be used is generally thermotropic polyesters, thermotropic polyesteramides, thermotropic polyamides, or a mixture of these. It is preferable to use fully aromatic polyesters or copolyesters as component (B). Suitable liquid-crystalline polymers have, for example, repeat units of the following structure:

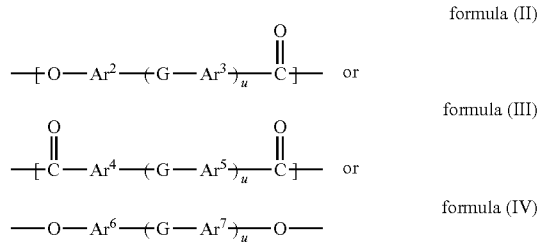

or units from the structure (II and III) or (II and IV) or (III and IV) or (II and III and IV).

Ar$^2$ to Ar$^7$ here are independently of one another respectively an arylene group, where these can have from 6 to 18 carbon atoms. Suitable arylene groups are inter alia phenylene, naphthylene, or biphenylene. The arylene groups can have substitution or can bear substituents. Among these substituents are $C_1$-$C_{10}$-alkyl moieties, such as methyl, n-propyl, n-butyl, or t-butyl, and also $C_1$-$C_4$-alkoxy groups, such as methoxy, ethoxy, or butoxy. The substituents can also be phenyl moieties or halogen atoms, in particular chlorine.

The variable u can assume the value 0 or 1.

G represents SO$_2$ or a 1,4-benzoquinone moiety.

By way of example, polyesters of this type derive from one or more of the following monomeric units: p-hydroxybenzoic acid, m-hydroxybenzoic acid, terephthalic acid, isophthalic acid, hydroxyquinone, phenylhydroquinone, alkyl-substituted hydroquinones, in particular 2-methylhydroquinone, 2-ethylhydroquinone, 2-n-propylhydroquinone, 2-i-propylhydroquinone, 2-tert-butylhydroquinone, halogen-substituted 2-n-hydroquinones, in particular 2-chlorohydroquinone.

Other examples of suitable monomers are 4,4'-dihydroxydiphenyl ether, 1,3-dihydroxy-benzene, 4,4'-biphenol, 2,6,2',6'-tetramethylbiphenol, 2,6-dihydroxynaphthalene, 2,7-dihydroxynaphthalene, 2,6-naphthalenedicarboxylic acid, 6-hydroxy-2-naphthalenecarboxylic acid, 4,4'-bis(p-hydroxyphenoxy)diphenyl sulfone, 2,6-dihydroxyanthra-quinone, 4,4'-diphenyl ether dicarboxylic acid, and 4,4'-dihydroxybenzophenone. Particularly suitable compounds are p-acetoxybenzoic acid and 2,6-acetoxy-naphthalenecarboxylic acid, and also hydroxy compounds activated via esterification. Polyesters which derive from abovementioned dicarboxylic acids and from aliphatic or cycloaliphatic polyols, preferably diols, are equally suitable. Diols that can be used are compounds of formula (V):

$$HO-R^8.OH \qquad \text{formula (V)}.$$

$R^8$ here represents $C_2$-$C_{18}$-alkylene units, preferably $C_2$-$C_{10}$-alkylene units, in substituted or unsubstituted form. Examples of suitable units are ethylene, propylene, butylene, pentylene, and hexylene. It is particularly preferable that in each case one of the two hydroxy groups is bonded to the first or last carbon atom. $R^8$ can moreover be an unsubstituted or substituted cycloaliphatic moiety having from 3 to 13 carbon atoms, preferably from 5 to 8 carbon atoms, for example cyclopropylene, cyclopentylene, or cyclohexylene. Preferred diols are ethylene glycols, 1,4-butanediol, 2,2-dimethyl-1,3-propanediol, 1,6-hexanediol, 1,10-decanediol, and 1,4-cyclohexanedimethanol. Particularly preferred molding compositions of the invention comprise, as component (B), liquid-crystalline copolyesters having repeat units of the structure

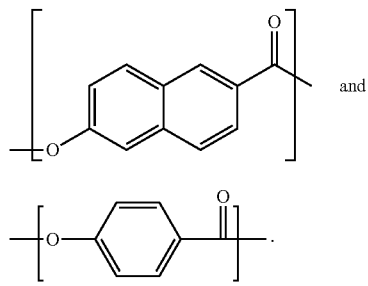

These copolyesters generally comprise from 10 to 90 mol % of the units (VI) and from 10 to 90 mol % of the units (VII).

Polyesterimides can also be used as liquid-crystalline component (B), where these exhibit repeat units of the structure (VIII) alone and/or in combination with units of the formula (III) and/or (IV) and/or (V).

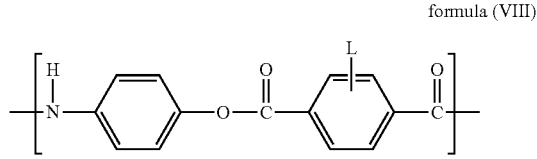

The moiety L can be hydrogen, $C_1$-$C_{10}$-alkyl, e.g. methyl, ethyl, n-propyl, isopropyl, or n-butyl, preferably methyl, $C_1$-$C_{10}$-alkoxy, e.g. methoxy, ethoxy, n-propoxy, isopropoxy, or n-butoxy, preferably methoxy, or halogen, preferably chlorine.

The molar masses Mw (weight average) of the liquid-crystalline polymers used in the invention as component (B) are in general from 1500 to 150 000 g/mol, preferably from 2500 to 50 000 g/mol. Mw can be determined by means of light scattering at 25° C. in a solution of phenol and ortho-dichlorobenzene in a ratio of 1:1.

The HDT heat deflection temperature of the thermotropic polymer (B) (method A, outer fiber stress of $\sigma_f$ 1.80 N/mm², constant heating rate 120 K/h) measured in accordance with DIN ISO 75-1 can be at from 140 to 200° C.

Liquid-crystalline polymers of this type are known per se or can be produced by known methods. Suitable production processes are mentioned by way of example in U.S. Pat. No. 4,161,470. Other production processes can be found by way of example in EP-A-139 303, EP-A-226 839, EP-A-226 978, EP-A-225 539, EP-A-226 847, and EP-A-257558.

In the invention, the thermoplastic molding compositions comprise at least one or more, but preferably one, polyarylene ether(s) (C) having an average of at least 1.5 phenolic end groups per polymer chain. The term "on average" here means numeric average.

Amounts of component (C) preferably present in the thermoplastic molding compositions of the invention are from 0.5 to 10% by weight, particularly preferably from 0.5 to 9% by weight, in particular from 1 to 8% by weight, very particularly preferably from 3 to 8% by weight, where the total of the proportions by weight of components (A) to (E) gives 100% by weight, based on the molding composition.

The production of polyarylene ethers with simultaneous control of end groups is known from the literature (McGrath et al. Polym. Eng. Sci. 17, 647 (1977)).

The polyarylene ethers (C) preferably have at least 0.15% by weight, in particular at least 0.18% by weight, particularly preferably at least 0.2% by weight, of phenolic end groups, based on the total amount of component (C), calculated in each case as amount by weight of OH. The average number of terminal phenolic groups can be determined by means of titration.

The respective upper limit for content of phenolic end groups in components (C) is a function of the number of available end groups per molecule (two in the case of linear polyarylene ethers) and of the number-average chain length. The person skilled in the art is aware of appropriate calculations.

The ratio by weight of component (A) to component (C) is preferably from 50:1 to 2:1, in particular from 25:1 to 5:1, particularly preferably from 20:1 to 10:1.

The polyarylene ethers (A) and (C) according to the present invention can—except for the end groups—be identical or be composed of different units and/or have different molecular weight, as long as they then remain completely miscible with one another.

Polyarylene ethers are a class of polymer known to the person skilled in the art. In principle, it is possible to use, as constituent of component (C), any of the polyarylene ethers that are known to the person skilled in the art and/or that can be produced by known methods. Appropriate methods have been explained above under component (A).

Preferred polyarylene ethers (C) are composed independently of one another of units of the general formula I (see above). Particularly preferred polyarylene ether sulfones (C) are termed polyether sulfone (PESU). This embodiment is very particularly preferred.

The preferred polyarylene ethers (C) generally have average molar masses $M_n$ (number average) in the range from 5000 to 60 000 g/mol, and relative viscosities of from 0.20 to 0.95 dl/g. The relative viscosities of the polyarylene ethers are determined in 1% by weight N-methylpyrrolidone solution at 25° C. in accordance with DIN EN ISO 1628-1.

The polyarylene ethers (C) of the present invention preferably have weight-average molar masses $M_w$ of from 10

000 to 150 000 g/mol, in particular from 15 000 to 120 000 g/mol, particularly preferably from 18 000 to 100 000 g/mol, determined by means of gel permeation chromatography in dimethylacetamide as solvent against narrowly-distributed polymethyl methacrylate as standard.

A preferred process for producing polyarylene ethers of component (C) is described below and comprises the following steps in the sequence a-b-c:
(a) provision of at least one polyarylene ether (C*) in the presence of a solvent (S), where the content of phenolic end groups in this polyarylene ether is appropriate for the desired component (C), where the phenolic end groups thereof are present in the form of phenolate end groups, and this polyarylene ether is preferably composed of units of the general formula I as defined above,
(b) addition of at least one acid, preferably of at least one polybasic carboxylic acid, and
(c) obtaining the polyarylene ethers of component (C) in the form of solid.

The polyarylene ether (C*) is preferably provided here in the form of a solution in the solvent (S).

There are in principle various ways of providing the polyarylene ethers (C*) described. By way of example, an appropriate polyarylene ether (C*) can be brought directly into contact with a suitable solvent and directly used in the process of the invention, i.e. without further reaction. As an alternative, prepolymers of polyarylene ethers can be used and reacted in the presence of a solvent, whereupon the polyarylene ethers (C*) described are produced in the presence of the solvent.

However, the polyarylene ether(s) (C*) is/are preferably provided in step (a) via reaction of at least one starting compound of structure X—Ar—Y (s1) with at least one starting compound of structure HO—Ar$^1$—OH (s2) in the presence of a solvent (S) and of a base (B), where
Y is a halogen atom,
X is selected from halogen atoms and OH, and
Ar and Ar$^1$ independently of one another are an arylene group having from 6 to 18 carbon atoms.

The ratio of (s1) and (s2) here is selected in such a way as to produce the desired content of phenolic end groups. Suitable starting compounds are known to the person skilled in the art or can be produced by known methods.

Hydroquinone, resorcinol, dihydroxynaphthalene, in particular 2,7-dihydroxynaphthalene, 4,4'-dihydroxydiphenyl sulfone, bisphenol A, and 4,4'-dihydroxybiphenyl are particularly preferred as starting compound (s2).

However, it is also possible to use trifunctional compounds. In this case, branched structures are produced. If a trifunctional starting compound (s2) is used, preference is given to 1,1,1-tris(4-hydroxyphenyl)ethane.

The quantitative proportions to be used are in principle a function of the stoichiometry of the polycondensation reaction that proceeds, with cleavage of the theoretical amount of hydrogen chloride, and the person skilled in the art adjusts these in a known manner. However, an excess of (s2) is preferable, in order to increase the number of phenolic OH end groups.

In this embodiment, the molar (s2)/(s1) ratio is particularly preferably from 1.005 to 1.2, in particular from 1.01 to 1.15, and very particularly preferably from 1.02 to 1.1.

As an alternative, it is also possible to use a starting compound (s1) having X=halogen and Y=OH. In this case, an excess of hydroxy groups is achieved via addition of the starting compound (s2). In this case, the ratio of the phenolic end groups used to halogen is preferably from 1.01 to 1.2, in particular from 1.03 to 1.15, and very particularly preferably from 1.05 to 1.1.

It is preferable that the conversion in the polycondensation reaction is at least 0.9, so as to provide an adequately high molecular weight. If a prepolymer is used as precursor of the polyarylene ether, the degree of polymerization is based on the number of actual monomers.

Preferred solvents (S) are aprotic polar solvents. The boiling point of suitable solvents is moreover in the range from 80 to 320° C., in particular from 100 to 280° C., preferably from 150 to 250° C. Examples of suitable aprotic polar solvents are high-boiling ethers, esters, ketones, asymmetrically halogenated hydrocarbons, anisole, dimethylformamide, dimethyl sulfoxide, sulfolane, N-ethyl-2-pyrrolidone, and N-methyl-2-pyrrolidone.

The reaction of the starting compounds (s1) and (s2) preferably takes place in the abovementioned aprotic polar solvents (S), in particular N-methyl-2-pyrrolidone.

The person skilled in the art knows per se that the reaction of the phenolic OH groups preferably takes place in the presence of a base (Ba), in order to increase reactivity with respect to the halogen substituents of the starting compound (s1).

It is preferable that the bases (Ba) are anhydrous. Particularly suitable bases are anhydrous alkali metal carbonate, preferably sodium carbonate, potassium carbonate, calcium carbonate, or a mixture thereof, and very particular preference is given here to potassium carbonate.

A particularly preferred combination is N-methyl-2-pyrrolidone as solvent (S) and potassium carbonate as base (Ba).

The reaction of the suitable starting compounds (s1) and (s2) is carried out at a temperature of from 80 to 250° C., preferably from 100 to 220° C., and the boiling point of the solvent provides an upper restriction on the temperature here. The reaction preferably takes place within a period of from 2 to 12 h, in particular from 3 to 8 h.

It has proven advantageous, after step (a) and prior to conduct of step (b), to filter the polymer solution. This removes the salt formed during the polycondensation reaction, and also any gel that may have formed.

It has also, proven advantageous for the purposes of step (a) to adjust the amount of the polyarylene ether (C*), based on the total weight of the mixture of polyarylene ether (C*) and solvent (S), to from 10 to 70% by weight, preferably from 15 to 50% by weight.

For the purposes of step (b), at least one acid is added, preferably at least one polybasic carboxylic acid, to the polyarylene ether (C*) from step (a), preferably to the solution of the polyarylene ether (C*) in the solvent (S).

It is also possible to add at least one polybasic carboxylic acid to the precipitant.

"Polybasic" means a basicity of at least 2. The basicity is the (if appropriate average) number of COOH groups per molecule. Polybasic means basicity of two or higher. For the purposes of the present invention, preferred carboxylic acids are dibasic and tribasic carboxylic acids.

The polybasic carboxylic acid can be added in various ways, in particular in solid or liquid form or in the form of a solution, preferably in a solvent miscible with the solvent (S).

The number-average molar mass of the polybasic carboxylic acid is preferably at most 1500 g/mol, in particular at most 1200 g/mol. At the same time, the number-average molar mass of the polybasic carboxylic acid is preferably at least 90 g/mol.

Particularly suitable polybasic carboxylic acids are those according to the general structure (IX):

HOOC—R—COOH    formula (IX), where R represents a hydrocarbon moiety having from 2 to 20 carbon atoms and optionally comprising further functional groups, preferably selected from OH and COOH.

Preferred polybasic carboxylic acids are $C_4$-$C_{10}$ dicarboxylic acids, in particular succinic acid, glutaric acid, adipic acid, and tricarboxylic acids, in particular citric acid. Particularly preferred polybasic carboxylic acids are succinic acid and citric acid.

In order to provide adequate conversion of the phenolate end groups to phenolic end groups, it has proven advantageous to adjust the amount of the polybasic carboxylic acid(s) used in respect of the amount of the phenolate end groups.

For the purposes of step (b) it is preferable to add a polybasic carboxylic acid so that the amount of carboxy groups is from 25 to 200 mol %, preferably from 50 to 150 mol %, particularly preferably from 75 to 125 mol %, based on the molar amount of phenolic end groups.

If the amount of acid added is too small, the precipitation properties of the polymer solution are inadequate, while any markedly excessive addition can cause discoloration of the product during further processing.

For the purposes of step (c), the polyarylene ether (C) is obtained in the form of solid. In principle, various processes can be used for obtaining the material in the form of solid. However, it is preferable to obtain the polymer composition via precipitation.

The preferred precipitation process can in particular take place via mixing of the solvent (S) with a poor solvent (S'). A poor solvent is a solvent in which the polymer composition is not soluble. This poor solvent is preferably a mixture of a non-solvent and a solvent. A preferred non-solvent is water. A preferred mixture (S') of a solvent with a non-solvent is preferably a mixture of the solvent (S), in particular N-methyl-4-pyrrolidone, and water. It is preferable that the polymer solution from step (b) is added to the poor solvent (S'), the result being precipitation of the polymer composition. It is preferable here to use an excess of the poor solvent. It is particularly preferable that the polymer solution from step (a) is added in finely dispersed form, in particular in droplet form.

If the poor solvent (S') used comprises a mixture of the solvent (S), in particular N-methyl-2-pyrrolidone, and of a non-solvent, in particular water, a preferred solvent:non-solvent mixing ratio is then from 1:2 to 1:100, in particular from 1:3 to 1:50.

A mixture of water and N-methyl-2-pyrrolidone (NMP) in combination with N-methyl-2-pyrrolidone as solvent (S) is preferred as poor solvent (S'). An NMP/water mixture in the ratio of from 1:3 to 1:50, in particular 1:30, is particularly preferred as poor solvent (S').

The precipitation is particularly efficient if the content of polymer composition in the solvent (S), based on the total weight of the mixture made of polymer composition and solvent (S), is from 10 to 50% by weight, preferably from 15 to 35% by weight.

The potassium content of component (C) is preferably at most 600 ppm. Potassium content is determined by means of atomic spectroscopy.

The thermoplastic molding compositions of the present invention preferably comprise, as component (D), at least one fibrous or particulate filler, the amount of which is particularly preferably from 10 to 70% by weight, very particularly preferably from 15 to 65% by weight, in particular from 20 to 55% by weight, for example from 35 to 50% by weight, based on a total of 100% by weight of components (A) to (E).

The molding compositions of the invention can in particular comprise particulate or fibrous fillers, particular preference being given here to fibrous fillers.

Preferred fibrous fillers are carbon fibers, potassium titanate whiskers, aramid fibers, and particularly preferably glass fibers. If glass fibers are used, these can have been equipped with a size, preferably with a polyurethane size, and with a coupling agent, to improve compatibility with the matrix material. The diameter of the carbon fibers and glass fibers used is generally in the range from 6 to 20 μm. Component (D) is therefore particularly preferably composed of glass fibers.

The form in which glass fibers are incorporated can either be that of short glass fibers or else that of continuous-filament fibers (rovings). The average length of the glass fibers in the finished injection molding is preferably in the range from 0.08 to 0.5 mm.

Carbon fibers or glass fibers can also be used in the form of textiles, mats, or glass-silk rovings.

Suitable particulate fillers are amorphous silica, carbonates, such as magnesium carbonate and chalk, powdered quartz, mica, various silicates, such as clays, muscovite, biotite, suzoite, tin maletite, talc, chlorite, phlogopite, feldspar, calcium silicates, such as wollastonite, or aluminum silicates, such as kaolin, particularly calcined kaolin.

Preferred particulate fillers are those in which at least 95% by weight, preferably at least 98% by weight, of the particles have a diameter (greatest diameter through the geometric center), determined on the finished product, of less than 45 μm, preferably less than 40 μm, where the value known as the aspect ratio of the particles is in the range from 1 to 25, preferably in the range from 2 to 20, determined on the finished product. The aspect ratio is the ratio of particle diameter to thickness (greatest dimension to smallest dimension, in each case through the geometric center).

The particle diameters can by way of example be determined here by recording electron micrographs of thin layers of the polymer mixture and evaluating at least 25 filler particles, preferably at least 50. The particle diameters can also be determined by way of sedimentation analysis, as in Transactions of ASAE, page 491 (1983). Sieve analysis can also be used to measure the proportion by weight of the fillers with diameter less than 40 μm.

The particulate fillers used particularly preferably comprise talc, kaolin, such as calcined kaolin, or wollastonite, or a mixture of two or all of said fillers. Among these, particular preference is given to talc having a proportion of at least 95% by weight of particles with diameter smaller than 40 μm and with aspect ratio of from 1.5 to 25, in each case determined on the finished product. Kaolin preferably has a proportion of at least 95% by weight of particles with diameter smaller than 20 μm and preferably has an aspect ratio of from 1.2 to 20, which in each case is determined on the finished product.

The molding compositions of the invention can comprise, as constituents of component (E), auxiliaries, in particular processing aids, pigments, stabilizers, flame retardants, or a mixture of various additives. Other examples of conventional additives are oxidation retarders, agents to counter decomposition by heat and decomposition by ultraviolet light, lubricants and mold-release agents, dyes, and plasticizers.

The proportion of component (E) in the molding composition of the invention is in particular from 0 up to 40% by weight, preferably from 0.1 up to 30% by weight, in particular from 0.1 to 25% by weight, very particularly preferably from 1 to 20% by weight, based on the total weight of components (A) to (E). If component (E) includes stabilizers, the proportion of said stabilizers is usually up to 2% by weight, preferably from 0.01 to 1% by weight, in particular from 0.01 to 0.5% by weight, based on the total of the % by weight values for components (A) to (E).

The amounts comprised of pigments and dyes are generally from 0 to 6% by weight, preferably from 0.05 to 5% by weight, and in particular from 0.1 to 3% by weight, based on the total of the % by weight values for components (A) to (E).

Pigments for the coloring of thermoplastics are well known, see for example R. Gächter and H. Müller, Taschenbuch der Kunststoffadditive [Plastics additives handbook], Carl Hanser Verlag, 1983, pages 494 to 510. A first preferred group of pigments that may be mentioned are white pigments, such as zinc oxide, zinc sulfide, white lead [2 $PbCO_3.Pb(OH)_2$], lithopones, antimony white, and titanium dioxide. Of the two most familiar crystalline forms of titanium dioxide (rutile and anatase), it is in particular the rutile form which is used for white coloring of the molding compositions of the invention. Black color pigments which can be used according to the invention are iron oxide black ($Fe_3O_4$), spinel black [$Cu(Cr, Fe)_2O_4$], manganese black (a mixture composed of manganese dioxide, silicon dioxide, and iron oxide), cobalt black, and antimony black, and also particularly preferably carbon black, which is mostly used in the form of furnace black or gas black. In this connection see G. Benzing, Pigmente für Anstrichmittel [Pigments for paints], Expert-Verlag (1988), pages 78 ff.

Particular color shades can be achieved by using inorganic chromatic pigments, such as chromium oxide green, or organic chromatic pigments, such as azo pigments or phthalocyanines. Pigments of this type are known to the person skilled in the art.

Examples of oxidation retarders and heat stabilizers which can be added to the thermoplastic molding compositions according to the invention are halides of metals of group I of the Periodic Table of the Elements, e.g. sodium halides, potassium halides, or lithium halides, examples being chlorides, bromides, or iodides. Zinc fluoride and zinc chloride can moreover be used. It is also possible to use sterically hindered phenols, hydroquinones, substituted representatives of said group, secondary aromatic amines, if appropriate in combination with phosphorus-containing acids, or to use their salts, or a mixture of said compounds, preferably in concentrations up to 1% by weight, based on the total of the % by weight values for components (A) to (E).

Examples of UV stabilizers are various substituted resorcinols, salicylates, benzotriazoles, and benzophenones, the amounts generally used of these being up to 2% by weight, based on the total of the % by weight values for components (A) to (E).

Lubricants and mold-release agents, the amounts of which added are generally up to 1% by weight, based on the total of the % by weight values for components (A) to (E), are stearyl alcohol, alkyl stearates, and stearamides, and also esters of pentaerythritol with long-chain fatty acids. It is also possible to use dialkyl ketones, such as distearyl ketone.

It is preferable that the molding compositions of the invention comprise from 0.1 to 2% by weight, preferably from 0.1 to 1.75% by weight, particularly preferably from 0.1 to 1.5% by weight and in particular from 0.1 to 0.9% by weight (based on the sum of the % by weight values of components (A) to (E)) of stearic acid and/or of stearates. In principle it is also possible to use other stearic acid derivatives, for example esters of stearic acid.

Stearic acid is preferably produced via hydrolysis of fats. The products thus obtained are usually mixtures composed of stearic acid and palmitic acid. These products therefore have a wide softening range, for example from 50 to 70° C., as a function of the constitution of the product. Preference is given to using products with more than 20% by weight content of stearic acid, particularly preferably more than 25% by weight. It is also possible to use pure stearic acid (>98%).

Component (E) can moreover also include stearates. Stearates can be produced either via reaction of corresponding sodium salts with metal salt solutions (e.g. $CaCl_2$, $MgCl_2$, aluminum salts) or via direct reaction of the fatty acid with metal hydroxide (see for example Baerlocher Additives, 2005). It is preferable to use aluminum tristearate.

Further additives that can be used are also those known as nucleating agents, an example being talc powder.

Components (A) to (E) can be mixed in any desired sequence.

The molding compositions of the invention can be produced by processes known per se, for example extrusion. The molding compositions of the invention can by way of example be produced by mixing the starting components in conventional mixing apparatuses, such as screw-based extruders, preferably twin-screw extruders, Brabender mixers, or Banbury mixers, or else kneaders, and then extruding them. The extrudate is cooled and comminuted. The sequence of the mixing of the components can be varied, and it is therefore possible to mix two or more than two components in advance, but it is also possible to mix all of the components together.

In order to obtain a mixture with maximum homogeneity, intensive and thorough mixing is advantageous. Average mixing times needed for this are generally from 0.2 to 30 minutes at temperatures of from 290 to 380° C., preferably from 300 to 370° C. The extrudate is generally cooled and comminuted.

The thermoplastic molding compositions of the invention can advantageously be used for producing moldings, fibers, foams, or films. The molding compositions of the invention are particularly suitable for producing moldings for household items or for electric or electronic components, and also for producing moldings for the vehicle sector, in particular automobiles.

The examples below provide further explanation of the invention, but do not restrict the same.

ISO Standards Cited

DIN ISO 527: Plastics—Determination of tensile properties—Part 1: General principles (ISO 527-1:1993 inclusive of Corr 1: 1994); German version EN ISO 527-1: 1996

DIN ISO 179: Plastics—Determination of Charpy impact properties—Part 2: Instrumented impact test (ISO 179-2: 1997); German version EN ISO 179:1999.

DIN EN ISO 1628-1: Plastics—Determination of the viscosity of polymers in dilute solution using capillary viscometers—Part 1: General principles (ISO 1628-1: 2009); German version EN ISO 1628-1:2009

DIN EN ISO 1043-1: Plastics—Symbols and abbreviated terms—Part 1: Basic polymers and their special characteristics (ISO 1043-1:2001); German version EN ISO 1043-1:2002.

DIN EN ISO 75-1 DE: Plastics—Determination of temperature of deflection under load—Part 1: General test method (ISO 75-1:2004); German version EN ISO 75-1:2004.

ISO 1133 Plastics—Determination of the melt mass-flow rate (MFR) and the melt volume-flow rate (MVR) of thermoplastics.

General Comments

The moduli of elasticity, ultimate tensile strength, and tensile strain at break of the specimens were determined on dumbbell specimens in the DIN ISO 527 tensile test.

The impact resistance of the products comprising glass fibers was determined on ISO specimens in accordance with ISO 179 1 eU. Notched impact resistance was likewise measured on ISO specimens in accordance with ISO 179 1 eA.

Melt viscosity was determined by means of a capillary rheometer. Apparent viscosity at 380° C. was determined here as a function of shear rate in a capillary viscometer (Göttfert Rheograph 2003 capillary viscometer) using a circular capillary of length 30 mm, radius 0.5 mm, an inlet angle of 180° for the nozzle, a diameter of 12 mm for the melt reservoir vessel, and a preheating time of 5 minutes. The values stated were determined at 1000 s$^{-1}$. Measurement was continued for 1 hour. The value stated is the quotient calculated from a value measured after 1 hour and the initial value.

The intrinsic viscosity of the polyarylene ethers was determined in 1% solution in N-methylpyrrolidone at 25° C. in accordance with EN ISO 1628-1.

Flowability is measured by means of MVR measurement in accordance with ISO 1133 at a melt temperature of 360° C. with an applied weight of 10 kg.

EXAMPLES

Component A1

A polyether sulfone with intrinsic viscosity of 49.0 ml/g was used as component A1. The product used had 0.19% by weight of Cl end groups and 0.23% by weight of OCH$_3$ end groups. Apparent melt viscosity determined for 350° C./1150 s$^{-1}$ is 263 Pa*s.

Component A2

A polyether sulfone with intrinsic viscosity 43.4 ml/g was used as component A2. The product used had 0.24% by weight of Cl end groups and 0.27% by weight of OCH$_3$ end groups. Apparent melt viscosity determined for 350° C./1150 s$^{-1}$ is 179 Pa*s.

Component B

A liquid-crystalline copolyester having repeat units of the formula VI and VII, characterized by a modulus of elasticity of 10.4 GPa and by a HDTA heat deflection temperature of 187° C. measured in accordance with DIN ISO 75-1 is used as thermotropic polymer B.

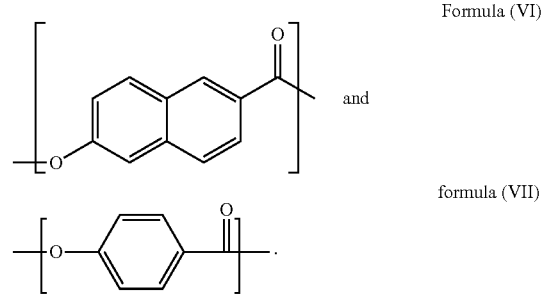

Formula (VI)

formula (VII)

Component C

A polyether sulfone with intrinsic viscosity 55.6 ml/g was used as component C; it had 0.20% by weight of OH end groups and 0.02% by weight of Cl end groups, based on the total mass of the polymer.

Component Comp1

A maleic-anhydride-functionalized polyether sulfone was used as component comp1; it had intrinsic viscosity 45.2 ml/g and anhydride content 0.32% by weight (determined by means of FTIR spectroscopy).

Component D

Chopped glass fibers with staple length 4.5 mm and fiber diameter 10 μm were used as component D, they had a polyurethane size.

Component Comp

A polyphenylene sulfide with melt viscosity 76 Pa*s for a shear rate of 1150 s$^{-1}$ at 350° C. was used as component comp.

TABLE 2

| Example | comp 1 | comp 2 | comp 3 | 4 | comp 5 | comp 6 | comp 7 | 8 | comp 9 | comp 10 |
|---|---|---|---|---|---|---|---|---|---|---|
| A1 | 60 | 55 | 57.5 | 52.5 | — | — | — | — | — | — |
| A2 | — | — | — | — | 55 | 50 | 52.5 | 47.5 | 47.5 | 41 |
| B | — | 0 | 2.5 | 2.5 | — | — | 2.5 | 2.5 | 2.5 | — |
| C1 | — | 5 | — | 5 | — | 5 | — | 5 | — | — |
| Comp1 | — | — | — | — | — | — | — | — | 5 | — |
| D | 40 | 40 | 40 | 40 | 45 | 45 | 45 | 45 | 45 | 45 |
| Comp | — | — | — | — | — | — | — | — | — | 14 |
| Modulus of elasticity [GPa] | 13.0 | 13.1 | 13.6 | 13.8 | 15.2 | 15.9 | 16.2 | 16.1 | 16.2 | 16.7 |
| Modulus of elasticity [GPa] at 180° C. | 10.4 | 10.5 | 10.9 | 11.0 | 12.6 | 12.8 | 13.3 | 13.2 | 12.8 | 8.9 |
| Tensile strain at break [%] | 1.8 | 2.0 | 1.4 | 2.2 | 1.4 | 1.5 | 1.1 | 1.5 | 0.9 | 1.3 |

TABLE 2-continued

| Example | comp 1 | comp 2 | comp 3 | 4 | comp 5 | comp 6 | comp 7 | 8 | comp 9 | comp 10 |
|---|---|---|---|---|---|---|---|---|---|---|
| Ultimate tensile strength [MPa] | 166 | 166 | 153 | 172 | 168 | 174 | 152 | 179 | 145 | 143 |
| ISO 179 1eU [kJ/m$^2$] | 45 | 49 | 37 | 53 | 45 | 46 | 33 | 51 | 34 | 39 |
| ISO 179 1eA [kJ/m$^2$] | 8.8 | 9.2 | 7.2 | 9.7 | 9.3 | 9.5 | 8.6 | 9.9 | 8.2 | 7.5 |
| MVR [ml/10'] 360° C./10 kg | 52 | 42 | 67 | 61 | 85 | 63 | 102 | 87 | 121 | 96 |

The invention claimed is:

1. A molding composition consisting essentially of
   a. from 29 to 89% by weight of at least one polyarylene ether sulfone having an average number of phenolic end groups per chain of from 0 to 0.2,
   b. from 0.5 to 20% by weight of a thermotropic polymer,
   c. from 0.5 to 10% by weight of a polyarylene ether sulfone having predominantly OH end groups comprising repeating units according to formula Ik $$\left[O-\underset{}{\bigcirc}-SO_2-\underset{}{\bigcirc}-O-\underset{}{\bigcirc}-SO_2-\underset{}{\bigcirc}\right] \quad \text{Ik}$$

d. from 10 to 70% by weight of at least one fibrous or particulate filler,
   e. from 0 to 40% by weight of additives or processing aids, where the total of the proportions by weight does not exceed 100% by weight, based on the thermoplastic molding composition.

2. The molding composition according to claim 1, where the apparent melt viscosity of the polyarylene ether sulfone A) for 350° C./1150 s$^{-1}$ is from 150 to 300 Pa s.

3. The molding composition according to claim 1, where the HDTA heat deflection temperature according to DIN ISO 75-1 of the thermotropic polymer (B) is from 140 to 200° C.

4. The molding composition according to claim 1, where the thermotropic polymer (B) is a copolyester comprising repeat units of the structures $$\left[O-\underset{}{\bigcirc\bigcirc}-\overset{O}{\underset{}{C}}\right] \quad \text{and} \quad (VI)$$

$$\left[O-\underset{}{\bigcirc}-\overset{O}{\underset{}{C}}\right]. \quad (VII)$$

5. The molding composition according to claim 4, where the thermotropic polymer is composed of from 10 to 90 mol % of the units (VI) and of from 10 to 90 mol % of the units (VII), where the total of the molar proportions is 100 mol %, based on the thermotropic polymer.

6. The molding composition according to claim 1, where a polyether sulfone having an average of at least 1.5 phenolic end groups per polymer chain is used as polyarylene ether C).

7. The molding composition according to claim 1, where the ratio by weight of component (A) to component (C) is from 50:1 to 2:1.

8. The molding composition according to claim 1, wherein the thermotropic polymer is present in an amount of 0.5 to 10% by weight.

9. The molding composition according to claim 1, wherein the at least one fibrous or particulate filler is present in an amount of from 30 to 70% by weight.

10. The molding composition according to claim 1, wherein the at least one fibrous or particulate filler is present in an amount of from 35 to 70% by weight.

11. The molding composition according to claim 10, wherein the thermotropic polymer is present in an amount of from 2.5 to 10% by weight.

12. The molding composition according to claim 11, wherein the polyarylene ether sulfone having predominantly OH end groups comprising repeating units according to formula Ik is present in an amount of from 5 to 10% by weight.

13. The molding composition according to claim 1, wherein the molding composition consists of components a through e, and wherein e is selected from the group consisting of processing aids, pigments, stabilizers, flame retardants, and mixtures thereof.

14. A fiber, foil, or molding comprising a thermoplastic molding composition according to claim 1.

15. A method for producing fibers, foils, or moldings comprising utilizing the thermoplastic molding composition according to claim 1.

* * * * *